Oct. 12, 1926.

W. B. GERO 1,602,526

CONTROL OF CRYSTAL DEVELOPMENT IN REFRACTORY METALS

Filed Sept. 15, 1922

Li.

Sr.

Cs.

K.

K.

Rb.

INVENTOR
WILLIAM B. GERO.
BY
ATTORNEY

Patented Oct. 12, 1926.

1,602,526

UNITED STATES PATENT OFFICE.

WILLIAM BENJAMIN GERO, OF EAST ORANGE, NEW JERSEY, ASSIGNOR TO WESTINGHOUSE LAMP COMPANY, A CORPORATION OF PENNSYLVANIA.

CONTROL OF CRYSTAL DEVELOPMENT IN REFRACTORY METALS.

Application filed September 15, 1922. Serial No. 588,364.

This application is a continuation-in-part of my copending application Serial No. 437,035, filed Jan. 13, 1921, method of manufacturing metallic filamentary material, and assigned to the Westinghouse Lamp Company.

The invention relates to the manufacture of refractory metals suitable for incandescent electric-lamp filaments and the like, and more particularly to the control of the crystalline development of tungsten by the addition of slected materials.

An object of my invention is the production of filamentary material of tungsten, molybdenum or the like to which salts of other metals, such as the alkali and alkaline-earth metals, have been added to control the crystal development thereof.

Another object of my invention is the development of refractory metal wire or filamentary material with a crystalline structure which is fixed and not subject to further development when used in an incandescent electric lamp and the like, whereby consequent sagging, twisting or other distortion is avoided to a large extent.

A further object of my invention is the predetermination of the shape and arrangement of the crystals forming a tungsten filament or the like by the addition to the material or oxide, from which the same is to be manufactured, of a small proportion of one or more of the alkali or alkaline-earth metals or a compound or compounds of the alkali or alkaline-earth metals, the additive substance selected depending on the kind of crystalline structure desired in the metal when manufactured into a coherent form, which is determined by the use to which the filament is to be put.

A still further object of my invention is the production of wire, composed of metal of the tungsten class, responsive to short heat-treatment, whereby a grain or crystal structure may be conveniently developed therein, in which equilibrium is established, that is, where there are no internal stresses due to growth or re-arrangement of the crystals, whereby the wire will not sag, twist or otherwise distort even when used under severe conditions.

Other objects and advantages will be made apparent as the description proceeds.

It has been discovered by experimentation that the crystalline structure of refractory metallic material such as tungsten, may be modified by the addition thereto or incorporation therein of certain substances whereby the tendency of filamentary tungsten and the like to sag and otherwise distort, when highly heated, may be overcome to a great extent. It has been found that the amount of sag and other distortion in refractory filamentary material depends, to a great extent, on the crystalline structure of such material and the following substances, which have been used to prevent distortion of heated filamentary material, do so by controlling or modifying the crystalline development of such material.

Among the substances added to refractory metallic material for the above mentioned purpose are compounds of lithium, sodium, potassium, rubidium, cæsium, beryllium, strontium, calcium, barium, and other metals.

Metals especially adapted for controlling crystalline development have been found to be alkali and alkaline-earth metals which appear to promote the crystalline development of refractory metallic material, whereas certain other materials appear to retard such crystalline development. I conclude, therefore, that elements which form oxides that are generally classified as non-reducible in hydrogen, may be divided into two general classes, those which oppose or repress crystallization when added to tungsten or other similar refractory metal and those that promote such crystallization. Examples of the former are thorium and aluminum, whereas examples of the latter are the alkali and alkaline-earth metals.

It is to be understood that this effect takes place when a filament containing such an admixture is heated or annealed. Furthermore, each material exerts a different effect on the character of the resultant crystals. This effect appears to be a controlling factor in determining the shape and contour of the crystals, the direction of maximum growth, the speed of crystallization and the germination point. Considered from a practical standpoint, the characteristics of the crystals of a filament or wire can be predetermined before the metal is produced by controlling the additive material or materials.

Certain factors, such as impurities in the class of substances which oppose the tendency to crystal growth, may interfere with the development of the structure characteristic of any of these materials. For example, metal may have been treated with potassium compounds and normally, one would expect potassium characteristics. If, however, an impurity such as thoria is present in sufficient quantities, the crystal structure may be considerably modified. Some materials, such as compounds of lithium, exert a strong effect, while others, such as sodium and potassium compounds, exert definite but weaker effects. Impurities will not interfere with the development of crystalline structure by materials like the former as much as they will with that of the latter. When the impurity is a compound of an alkali or alkaline-earth metal, in certain proportions, the crystalline structure produced may not be characteristic of either one, but the result of the modifying effect of the impurity on the additive material.

Different compounds of the same metal, for example, either lithium chloride or lithium nitrate, give the same crystalline characteristic structure of lithium material. This indicates that probably the metal, and not the associated radical, determines the ultimate structure of the wire. There is every reason to believe that compounds of each element or at least each metallic element, when introduced into refractory metal such as tungsten, will exert a definite effect upon the crystalline habits of such metal. This fact is characteristic of the material introduced and, for the same material, the effect is the same unless offset by other factors, such as impurities which oppose this effect.

All materials which are excluded from the crystalline formation and segregate at the grain boundaries have similar effects on the crystalline structure of tungsten and the like, that is, they oppose crystal growth and promote the formation of fine grains of uniform size. Conversely, in order that any material may change the crystalline habits of a tungsten filament, for example, it very likely must, in some way, take part in the crystalline formation. Most of the materials of this class such as the alkali and alkaline-earth metals show a fairly low volatilization point so that considerable of the material added will undoubtedly volatilize during heat-treatment of the refractory metal. Some, however, it is thought, must combine with the tungsten metal or oxide with the formation of a compound or compounds more refractory than the additive material and, in this way, some of said material is retained in the ingot or slug during the treating operation. Such combinations are then probably absorbed in the crystals and exert their characteristic effect on the form and size thereof. The additive material may or may not be reduced during such treatment.

The additive material not only affects the crystalline development of the finished product when introduced into the oxide of the refractory metal before reduction, but the same introduced into the powdered metal or even the wire itself would probably accomplish the desired result.

My invention will better be understood by referring to the accompanying drawing, in which:—

Figure 4:
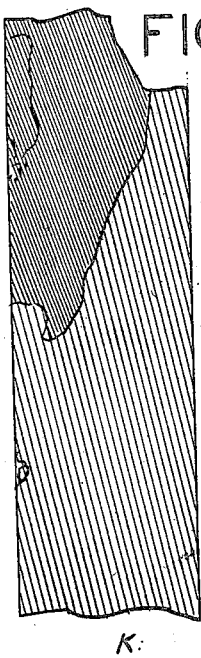
Figure 5:
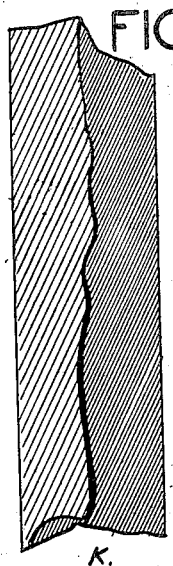
Figure 6:
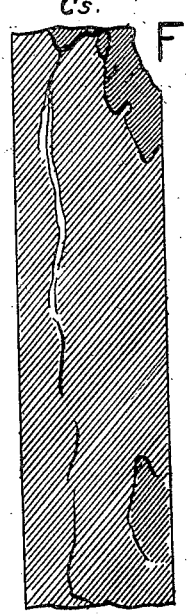

Figs. 4 and 5 are similar views of filaments to which have been added during the process of manufacture a compound of potassium; and, Fig. 6 is a similar view of a filament to which has been added during the process of manufacture a compound of rubidium.

Figure 1:
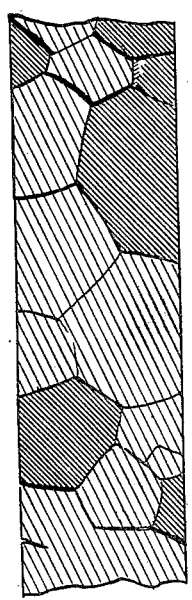
Fig. 1 represents a micro-photograph showing an etched longitudinal section of a tungsten filament magnified 200 diameters, said filament being approximately 7 mils in diameter and being prepared with the addition of a small proportion of a compound of lithium.

It will be noted that the addition of lithium to the material used for preparing a refractory metal filament causes the formation of large crystals fairly regular in size and shape, as shown in Fig. 1. These crystals appear to be largely hexagonal, and wire of such crystalline formation appears to be specially adapted for the larger sizes of incandescent electric lamp filaments.

Figure 2:
Fig. 2 is a similar longitudinal sectional view of a filament prepared with the addition of a small amount of a compound of strontium.
Figure 3:
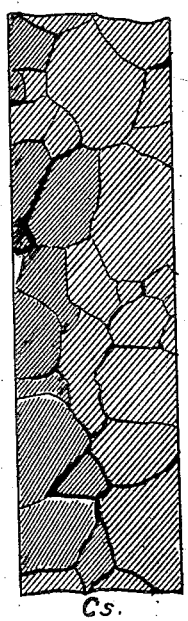
Fig. 3 is a similar view of a filament to which has been added a compound of cæsium during the process of manufacture.

Strontium and cæsium have crystal effects as illustrated in Figs. 2 and 3 but the crystalline formation is very similar to that obtained by the use of lithium compounds as will be noted by comparison with Fig. 1. Potassium, on the other hand, appears to promote the development of elongated interlocking crystals irregular in size and shape as represented in Figs. 4 and 5. Such a formation is best adapted for filaments of the smaller sizes.

By referring to Fig. 6, it will be noted that rubidium gives characteristic crystalline effects, similar to those obtained with the use of potassium, as will be observed by comparing Fig. 6 with Figs. 4 and 5.

The following experiment was performed to compare the relative effects of potassium, sodium and lithium as additive or "doping" material in the formation of refractory metallic filamentary material of various sizes. 32 kgs. of regular purified tungstic oxide was divided into four portions of 8 kgs. each, one portion being reduced without the addition of any crystal-controlling material and the other portions were modified by the addition of potassium hydroxide, sodium hydroxide and lithium nitrate, respectively.

| Metal. | Added material. | Per cent of alkali metal oxide, by weight. |
|---|---|---|
| 1 | | |
| 2 | KOH | .16 |
| 3 | NaOH | .18 |
| 4 | LiNO₃ | .09 |

All batches were heated to about 500 to 600° C. and reduced by the same process. The metal was pressed in 220 gram, ¼ inch slugs, 16 inches long, treated and retreated on the same schedule. The treating current was 1600 amperes for 12 minutes and the retreating current was 80% of that calculated for causing fusion of the rod or slug, then 160 mils in diameter.

The oxide was so prepared as to be originally free from any materials which would effect its crystalline structure; therefore, the structure obtained from the metal #1 is the normal structure for pure tungsten or, at least, for that of tungsten produced from the oxide used. Then, by giving all the same treatment and comparing that to which the alkali metal compounds were added with pure tungsten, a method of evaluating the effect of the various crystal controlling materials was attained. All precautions were taken to insure parallel treatment for all slugs, such as treating at the same time and using the same smoothing die before retreating. The following table shows the results obtained, so far as the grain development is concerned.

*Grain count.*

| Metal. | Initial, before swaging. | | Re-treated, after swaging. | |
|---|---|---|---|---|
| | Count. | Variation between maximum and minimum. | Count. | Variation between maximum and minimum. |
| | | Per cent. | | Per cent. |
| | 1050 | 12 | 400 | 15 |
| | 2340 | 27 | 425 | 16 |
| | 2040 | 5 | 165 | 56 |
| | 2690 | 3 | 59 | 85 |

The grain-size contrast figured from the maximum variation in the number of grains obtained on the three determinations which, in each case, make up the average is in the order of metal number 2, 1, 3 and 4; that is, the grain-size contrast was the highest with the use of potassium and the lowest with the use of lithium.

After working these ingots to 160 mils, however, the grain count and grain percentage variation of the retreated or annealed specimens are reversed. The order of grain count is decreasing with the atomic weight of the additive metal, the grain percentage variation being increasing from metal 2 to metal 4, instead of decreasing as was the case on the initial treating. These facts form conclusive evidence that the various additive materials, even at this early stage in the process, have exerted a characteristic effect upon the tungsten. This effect may be traced throughout the process. The characteristics developed by some of these materials annealed as drawn wire about 7 mils in diameter are illustrated in the attached drawings. As shown in Fig. 1, for a drawn filament, the lithium-treated material is particularly distinctive in the size of crystals and the fairly regular boundaries thereof.

A practical application of the above described discovery may be illustrated by the production of filamentary material for motion picture or projector lamps. Such lamps are constructed of four coiled filamentary sections parallel to each other and set at a definite distance from each other. The images of the coiled sections are reflected between the adjacent sections by a mirror suitably placed, giving the effect of an uninterrupted band of light when projecting on a sceen.

When a filament operates at the high temperature which is required in such lamps it is frequently found that the portions of the coils will become separated, giving the phenomenon of sagging. Another defect which develops and disturbs the distribution of light is known as twisting, that is, a displacement of one section of a coil with respect to another about an axis midway between, and parallel to, the sections.

Twisting may take place in other ways but this is the most prominent form. Any displacement of any section of the coil, as described above or otherwise, which interferes with the distribution of light makes the lamp ineffective and necessitates its replacement.

Experience has demonstrated that it is extremely difficult to obtain a filament which will resist the development of all these defects when operated at high temperature and therefore, it is to be considered that unusually severe conditions are improved upon a filament for motion picture lamps of the aforedescribed incandescent type. Ingenious devices have been devised in attempts to eliminate the distortion of such filaments. Among these may be mentioned, special anchors which operate to prevent twisting, also winding adjacent coils in reverse directions, so that the tendency to twist will be neutralized between any two adjacent coils. These expedients have the effect of increasing cost and complicating the process of manufacture and frequently prove ineffective.

Wire or filament has been produced according to my invention, which fulfills all the conditions necessary for a motion-picture lamp and is resistant to both sag and twist.

The following method is an example of how such wire may be produced but it is obvious that various changes may be made in the details of the described process and proportions of the constituents. Also, I do not wish to be limited to the precise details set forth, and it should be understood that the lithium compound may be replaced by one or more compounds of metals such as cæsium, strontium, calcium and barium, with or without other material, such as alkali-metal compounds, for the development of crystal structures similar to that developed with the use of lithium, as will be appreciated by comparing Figs. 1, 2 and 3.

It has been found that purified tungstic oxide varies in its properties according to the method employed in its purification. These variations are apparent to those familiar with the material, and may show as differences in density, particle size or chemical activity. Generally, oxides prepared by the usual processes of precipitating a soluble salt of tungsten in hot acids have given good results and I give one method for purifying oxide which will also give a product satisfactory for the purposes of my invention.

68 kgs. of commercial tungstic acid may be dissolved in a mixture of 64 liters of ammonia specific gravity .9, and 160 liters of distilled water. After the residue is settled the solution is filtered. This solution may be distributed in stoneware dishes of approximately 40 gallons capacity. Concentrated hydrochloric acid, of specific gravity 1.19 may be added slowly through a ⅛ inch orifice to precipitate para-ammonium-tungstate, which is thoroughly washed and dried. The ammonia in the compound may be eliminated either by heating, to a temperature not exceeding 1300° F., or by digesting in acids. The oxide remaining will be found to have been purified, by the aforedescribed operations, sufficiently for making wire according to my invention.

Lithium nitrate may be incorporated into the purified tungstic oxide so that the content therein is about .1% of lithium oxide by weight. (About .05% of lithium by weight). This mixture is preferably dried at a temperature sufficiently high to drive off the oxides of nitrogen. The dried and powdered tungstic oxide containing lithium oxide may then be reduced to powdered metal according to some known method. Other methods may be used for reducing the tungstic oxide containing the additive material. However, the following method is preferred.

200 grams of the purified tungstic oxide may be placed in a shallow container 30 inches long, made by bending a strip 2 inches wide formed of any desired common metal such as copper, iron, or the like into the shape of a semicircle and closing both ends. The material may be spread evenly throughout this container, which may then be passed through a tube 1¼ inches in diameter, at a speed of approximately 30 inches per hour. Approximately 20 cubic feet per hour of dry hydrogen gas is passed through this tube, its direction of flow being the reverse of the direction of travel of the oxide. The tube consists of a heated section 6 feet long, with extensions on each end to provide for introducing the oxide and removing the metal respectively.

A temperature gradient should be established along the tube, with the highest temperature near the exit end, such that the reduction to the metal proceeds slowly along its length, passing through the various stages, as indicated by the various oxides formed. The temperature should not be higher than is necessary to reduce the metal. I find that it is often advisable to divide the process into two steps and, instead of taking the reduction to completion at first, control the temperature such that a small quantity of brown oxide is still present with the reduced metal. The metal powder containing such oxide is then mixed with an equal quantity of the original oxide and reduced again under identical conditions, except that the temperature is raised sufficiently to effect complete reduction.

The metal powder produced, may then be pressed into slugs, treated, worked and drawn, that is, manufactured into a coherent body or wire by the usual process. Such wire, when annealed or lighted up, in an inert environment, for example, as an incandescent lamp filament, will develop a crystal-structure, characteristic of lithium-treated material. Furthermore, this wire is resistant to both sagging and twisting.

Lamps having filaments of various types including lithium-treated material were made up according to regular test practice, that is, a two section coil was mounted on leads without bottom anchors and supported a weight of 17 grams, thereby imposing unusually severe conditions on the filaments. Lamps of this type, with filaments 25 mils in diameter, were burned at 31 amperes in an inverted position for 10 hours. At the end of this time, the amount of sag and twist was noted and the results are as follows:

|  | Sag. | Twist. |
|---|---|---|
|  | Per cent. |  |
| Lithium-treated wire | 13.6 | None. |
| Thoria-treated wire | 108 | 30° |

Although a slight amount of sag is shown for the lithium-treated wire, it should be understood that it is caused by the unusually severe conditions imposed on said wire, which magnified or exaggerated the sag in the wire and are so severe that even the best non-sag wire, sags under these conditions. The results shown were selected at random and are representative of several similar comparisons. Lithium-treated wire, besides developing a characteristic crystal structure, is responsive to heat treatment. When heated for an extremely short period, in an inert environment, its grains develop fully and an equilibrium is established. This property may explain its resistance to twist, as its normal structure is developed immediately when first lighted up. The filament is, therefore, in a state of equilibrium and there are no internal stresses of crystal grains due to re-arrangement to cause the filament to distort or twist.

It will be appreciated that, according to my invention, the crystal structure of a filament is predetermined by properly selecting the additive material.

Potassium, rubidium, and, to a smaller extent, sodium treated metal gives material which tends to develop large grains which extend along the axis of the wire and these materials each give a characteristic but similar crystalline development and reference is made to Figs. 4, 5 and 6.

Lithium treated material, however, develops large grains of regular contour and fairly uniform size and, when prepared in filamentary form of fairly large diameter, for example, larger than about 10 mils, will neither sag substantially nor twist, even under severe conditions. It is, therefore, possible to manufacture tungsten wire or wire of other refractory metals of various characteristics from the same supply of purified oxide simply by the addition of selected materials.

Although the example given for preparing lithium treated wire states the use of .1% of lithium oxide as the amount found to work best, I do not wish to be limited to this figure, but it is thought that, for the best results, the quantity should not be less than about .02% or greater than about 1½% by weight. (From about .01% to about .75% of lithium by weight). I do not wish to be limited to the use of a single additive material for producing the desired results, as I have found that mixtures may be used to advantage, with one material modifying the effect of the other.

Although I have described what I now consider the preferred means of practicing my invention it is to be understood that the same are merely illustrative and that my invention is only limited by the scope of the appended claims.

What is claimed is:

1. The method of preparing tungsten powder from which may be produced non-sagging and non-offsetting filaments having predetermined grain or crystal structure which comprises mixing tungsten oxide, free from compounds deleteriously affecting the desired crystal development and a predetermined quantity of at least one compound of an alkali or alkaline earth metal capable of promoting the grain or crystal structure desired to be produced, partially reducing the mixture and mixing with said partially reduced mixture an additional quantity of the first mixture and then completely reducing said last mentioned mixture to obtain a mixture of tungsten metal and a compound containing the alkali or alkaline earth metal.

2. The method of preparing tungsten filaments having a grain or crystal structure fairly regular in size and shape, which comprises mixing tungsten oxide free from compounds deleteriously affecting the desired crystal structure, and a definite and determinable quantity of a compound or compounds containing alkali or alkaline earth metals capable of promoting a structure consisting of crystals or grains fairly regular in size and shape, reducing said mixture to tungsten metal and a compound or compounds containing the added alkali or alkaline earth metals, sintering and mechanically working the sintered metal to filament size.

3. The method of preparing tungsten filaments having a grain or crystal structure fairly regular in size and shape, which comprises mixing tungsten oxide free from compounds deleteriously affecting the desired crystal structure, and a definite and determinable quantity of compounds containing alkali and alkaline earth metals capable of promoting a structure consisting of crystals or grains fairly regular in size and shape, reducing said mixture to tungsten metal and compounds containing the added alkali and alkaline earth metals, sintering and mechanically working the sintered metal to filament size.

4. The method of preparing tungsten filaments having a predetermined grain or crystal structure which comprises mixing tungsten oxide, free from compounds deleteriously affecting the desired crystal development, and a predetermined quantity of a mixture of compounds of alkali or alkaline earth metals capable of promoting the grain or crystal structure desired to be produced, partially reducing the mixture and mixing with the said partially reduced mixture an additional quantity of the first mixture and then completely reducing said last mentioned mixture to obtain a mixture of tungsten metal and a compound containing the alkali or alkaline earth metals, pressing, sintering and mechanically working said sintered material to filament size.

5. The method of preparing tungsten filaments having a predetermined grain or crystal structure which comprises mixing tungsten oxide, free from compounds deleteriously affecting the desired crystal development, and a predetermined quantity of a mixture of compounds of alkali and alkaline earth metals capable of promoting the grain or crystal structure desired to be produced, partially reducing the mixture and mixing with the said partially reduced mixture an additional quantity of the first mixture and then completely reducing said last mentioned mixture to obtain a mixture of tungsten metal and compounds containing the alkali and alkaline earth metals, pressing, sintering and mechanically working said sintered material to filament size.

6. The method of preparing tungsten powder from which may be produced filaments possessing a grain structure resistant to sagging and twisting, which comprises mixing a tungsten oxide free from compounds deleteriously affecting the desired crystal development with a predetermined quantity of a compound or compounds containing lithium, strontium, calcium or caesium, partially reducing said mixture, adding a quantity of the first mixture to the partially reduced mixture and then completely reducing the same to obtain a mixture of tungsten metal and a compound or compounds containing lithium, strontium, calcium or caesium.

7. The method of preparing filamentary material having a predetermined crystal or grain structure which is resistant to sagging and offsetting which comprises mixing tungsten oxide free from compounds deleteriously affecting crystal development and a predetermined quantity of at least one compound of an alkali or alkaline earth metal capable of promoting the grain or crystal structure desired to be produced, partially reducing the mixture and mixing with the said partially reduced mixture an additional quantity of the first mixture and then completely reducing said last mentioned mixture to obtain a mixture of tungsten metal and the compound containing the additive material, pressing, sintering and working said material to the desired size and shape.

8. The method of preparing filamentary material having a predetermined crystal or grain structure which is resistant to sagging and offsetting which comprises mixing tungsten oxide free from compounds deleteriously affecting crystal development and a predetermined quantity of at least one salt of an alkali or alkaline earth metal capable of promoting the grain or crystal structure desired to be produced, partially reducing the mixture and mixing with the said partially reduced mixture an additional quantity of the first mixture and then completely reducing said last mentioned mixture to obtain a mixture of tungsten metal and a compound containing the additive material, pressing, sintering and working said material to the desired size and shape.

9. The method of preparing filamentary material having a predetermined crystal or grain structure which is resistant to sagging and offsetting which comprises mixing tungsten oxide free from compounds deleteriously affecting crystal development and a definite quantity of a mixture of compounds of an alkali or alkaline earth metal capable of promoting the grain or crystal structure desired to be produced, partially reducing the mixture and mixing with the said partially reduced mixture an additional quantity of the first mixture and then completely reducing said last mentioned mixture to obtain a mixture of tungsten metal and a compound containing the additive material, pressing, sintering and working said material to the desired size and shape.

10. The method of preparing filamentary material having a crystal or grain structure which is resistant to sagging and twisting which comprises mixing a tungsten oxide free from compounds deleteriously affecting crystal development and a compound containing at least one of the metals, lithium, caesium, calcium, or strontium, partially reducing the mixture, adding an additional quantity of the first mixture to the partially reduced mixture, substantially completely reducing the last mentioned mixture to obtain a mixture of tungsten metal and a compound containing the additive material, pressing, sintering and working said material to the desired size and shape.

11. The method of preparing filamentary material having a crystal or grain structure which is resistant to sagging and twisting which comprises mixing tungsten oxide free from compounds deleteriously affecting crystal development and a compound containing lithium, partially reducing the mixture, adding an additional quantity of the first mixture to the partially reduced mixture, substantially completely reducing the last mentioned mixture to obtain a mixture of tungsten metal and a compound containing the additive material, pressing, sintering and working said material to the desired size and shape.

12. The method of making non-sag and non-twist wire which comprises adding to a refractory metal oxide free from compounds deleteriously affecting crystal formation, a small amount of a compound containing at least one of the alkali or alkaline earth metals, lithium, strontium, calcium or caesium, and reducing the mixture to obtain a mixture of the refractory metal and a compound containing the additive material, and thereafter fabricating said powder into wire by sintering and mechanically working the sintered metal.

13. The method of making non-twist wire which comprises adding to a refractory metal oxide free from compounds deleteriously affecting crystal formation, a small amount of a mixture of compounds containing alkali or alkaline earth metals, such as lithium, strontium, calcium or cæsium, reducing the mixture to obtain a mixture of the refractory metal and compounds containing the additive materials and thereafter pressing, sintering and mechanically working said sintered metal to wire form.

14. The method of making non-twist wire which comprises adding to a refractory metal oxide free from compounds deleteriously affecting crystal formation, a small amount of a mixture of compounds containing alkali and alkaline earth metals, such as lithium, strontium, calcium or cæsium, reducing the mixture to obtain a mixture of the refractory metal and compounds containing the additive materials and thereafter pressing, sintering and mechanically working said sintered metal to wire form.

15. The method of making non-sag and non-twist tungsten wire which comprises adding to a tungsten oxide free from deleterious compounds affecting crystal growth, a small proportion of a salt of lithium, reducing said mixture to obtain a mixture of tungsten and a compound containing lithium, sintering and mechanically working the sintered metal to the desired size.

16. The method of preparing filamentary tungsten having a predetermined crystal structure, which comprises mixing with tungsten oxide free from compounds deleteriously affecting crystal growth, a plurality of compounds containing alkali or alkaline earth metals, said compounds being selected so that the desired crystal structure is promoted through the influence of one compound upon another, reducing said mixture, pressing, sintering and mechanically working the sintered metal to wire form.

17. The method of preparing filamentary tungsten having a predetermined crystal structure, which comprises mixing with tungsten oxide free from compounds deleteriously affecting crystal growth, a plurality of compounds containing alkali and alkaline earth metals, said compounds being selected so that the desired crystal structure is promoted through the influence of one compound upon another, reducing said mixture, pressing, sintering and mechanically working the sintered metal to wire form.

18. The method of preparing filamentary tungsten having non-sag and non-twist properties which comprises adding to tungstic oxide free from compounds deleteriously affecting crystal growth, lithium oxide in the proportion of about .1% by weight, reducing said mixture to obtain a mixture of tungsten metal and a compound containing lithium, sintering and mechanically working the sintered metal to about 10 mils diameter.

19. A coherent tungsten body having non-sag and non-twist properties and comprising substantially pure tungsten having large crystals fairly regular in shape and size.

20. Tungsten filamentary material capable of resisting sagging and twisting and comprising substantially pure tungsten having large crystals fairly regular in shape and size.

21. A substantially pure tungsten filament having a large grain structure which renders the filament resistant to sagging and twisting during a normal or commercially useful life.

22. A substantially pure tungsten filament having a large grain structure which renders the filament resistant to twisting during a normal or commercially useful life.

23. A coiled tungsten filament having non-sag and non-twist properties and comprising substantially pure tungsten having large crystals fairly regular in shape and size.

In testimony whereof, I have hereunto subscribed my name this 14th day of September, 1922.

WILLIAM BENJAMIN GERO.